(12) United States Patent
Brabec et al.

(10) Patent No.: US 7,085,033 B2
(45) Date of Patent: Aug. 1, 2006

(54) ELECTROCHROMIC COLOR SYSTEM

(75) Inventors: Christoph Brabec, Erlangen (DE); Hans Meixner, Haar (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/497,306

(22) PCT Filed: Sep. 5, 2002

(86) PCT No.: PCT/DE02/03294

§ 371 (c)(1), (2), (4) Date: Jun. 1, 2004

(87) PCT Pub. No.: WO03/048852

PCT Pub. Date: Jun. 12, 2003

(65) Prior Publication Data

US 2005/0174303 A1 Aug. 11, 2005

(30) Foreign Application Priority Data

Nov. 30, 2001 (DE) ................ 101 58 801

(51) Int. Cl.
*G02F 1/153* (2006.01)
(52) U.S. Cl. .............. 359/267; 359/271; 359/273
(58) Field of Classification Search .............. 359/265, 359/267, 270, 272, 273, 266.269, 271; 205/50, 205/121; 345/49
See application file for complete search history.

(56) References Cited

U.S. PATENT DOCUMENTS

| | | | | |
|---|---|---|---|---|
| 3,909,367 A * | 9/1975 | Patrie et al. | .................. | 205/50 |
| 4,229,080 A * | 10/1980 | Take et al. | .................. | 359/266 |
| 5,179,467 A * | 1/1993 | Buchwalter et al. | ........ | 359/270 |
| 5,737,114 A * | 4/1998 | Bailey | ........................ | 359/268 |
| 5,859,723 A * | 1/1999 | Jodicke et al. | .............. | 359/270 |
| 2003/0156314 A1* | 8/2003 | Shinozaki et al. | .......... | 359/273 |

FOREIGN PATENT DOCUMENTS

| | | |
|---|---|---|
| DE | 198 56 007 | 6/2000 |
| WO | WO 99 39395 | 8/1999 |

OTHER PUBLICATIONS

Patent Abstracts of Japan, vol. 1995, No. 04, May 31, 1995 & JP 07 005496 A (Kiyota Iwaki), Jan. 10, 1995 abstract.
Patent Abstracts of Japan, vol. 1995, No. 04, May 31, 1995 & JP 07 005495 A (Kiyota Iwaki), Jan. 10, 1995 abstract.

\* cited by examiner

*Primary Examiner*—Loha Ben
(74) *Attorney, Agent, or Firm*—Young & Thompson

(57) ABSTRACT

The invention relates to an intelligent color system that recognizes the ambient color and adapts its color accordingly according to the chameleon effect. The inventive system is obtained by combining an electrochromic color system with a semi-transparent array of photodetectors, for example combinations of individual pixels that are sensitive for the different colors (red, green blue), said array being superimposed on the electrochromic color system.

17 Claims, 1 Drawing Sheet

ELECTROCHROMIC COLOR SYSTEM

CROSS REFERENCE TO RELATED APPLICATIONS

This is the 35 USC 371 National Stage of International Application PCT/DE02/03294 filed on 5 Sep. 2002, which designated the United States of America.

FIELD OF THE INVENTION

The invention relates to an arrangement and a method for the operation of an electrochromic color system on those surfaces of objects which are visible from outside it.

BACKGROUND OF THE INVENTION

For many products, their coloring plays an essential role in terms of the customer's buying interest. In many applications for applying color to objects, the desire is that the item should be adapted to its environment in terms of its color as seen from outside it. This can be described as a "chameleon effect".

In electrochemical coloring systems, the color can be altered by doping of the coloring agent. In doing this, it is normal to use an electrochemical cell structure. The doping of the electrochemical coloring agent is effected by the application of an external voltage. The layer structure of an electrochemical cell consists typically of an electrode, the electrochemical coloring agent, the electrolyte and a counter electrode. There must be a seal between the two electrodes in order to avoid loss of the electrolyte. If a voltage is applied between the two electrodes, then the ions in the electrolyte start to diffuse into the coloring agent, and to oxidize or reduce it, which corresponds to a p-doping or an n-doping respectively. This will depend on the nature of the coloring agent and the voltage applied.

Until now, no solutions have been disclosed which permit a variable and at the same time predefinable surface color on objects.

OBJECT OF THE INVENTION

The object underlying the invention is to specify an electrochromic color system and an operating method for it, using which the coloring of visible parts of objects can be selectively varied.

This object is achieved by the combinations of attributes discussed below.

SUMMARY OF THE INVENTION

The invention is based on the realization that it is possible to give to an electrochromic color system, located on a surface of an object, prescribed colors, colored patterns or images, in single or multiple colors, on part or all of the surface, using photodetectors which are either external or integrated into the object, by using the photodetector to effect appropriate control of the color cells of the system.

It is possible to transfer and reproduce structured images by using numerous image points, both on the photodetector side and on the electrochromic color system side. In particular, photodiode arrays are used.

If these photodetectors are arranged directly on the color cells, then they must be of semitransparent material so that the color of the color cells which lie beneath the photodetectors, and are directly or indirectly controlled by them, is visible to the outside.

If, for example, three different colors are shown alongside each other on several neighboring color cells, and if the arrays have appropriate dimensions, it is possible to produce mixed colors.

An advantageous way of manufacturing organic photodetectors which are semi-transparent is on the basis of conjugated polymers, small molecules or combinations thereof.

By a combination of an electrochromic color system with a semi-transparent array of photodetectors, for example in combinations of individual pixels which are sensitive to the different colors (red, green, blue), which is laid over the electrochromic color system, it is possible to make an intelligent color system, which recognizes the color of the surroundings and adapts its color to match this, as with a "chameleon" effect.

The use of organic semi-transparent photodetectors seems suitable because it allows the detection system to be laid over the entire area of the electrochromic color system. However, it is also possible to imagine the use of inorganic photodetectors, such as for example the use of individual detectors which are externally positioned, or separately incorporated into the electrochromic system.

In particular, this system can be manufactured flexibly, by the use and build-up of the color system on semi-transparent metallized foils, such as ITO foils. Furthermore, this system permits a color differentiation or a grouping of color cells, for example pixellation, in that individual such electrochromic color elements are connected together on a common substrate.

The system thus enables systems to be achieved in which the electrochromic color system can be controlled by signals from an external color sensitive photosensor, or from one integrated into the color cells.

In an advantageous embodiment, a semi-transparent photodiode array is combined or integrated with an electrochromic color system, as appropriate.

BRIEF DESCRIPTION OF THE DRAWINGS

Exemplary embodiments are described below by reference to schematic figures, which shall not be taken to restrict the invention in any way.

DETAILED DESCRIPTION OF THE INVENTION

In electrochromic color systems, one can change the color by doping the coloring agent. Normally, this is done by using the structure of an electrochemical cell, and the doping of the electrochromic coloring agent is effected by applying a voltage. The layer structure of an electrochemical cell consists typically of an electrode, the electrochromic coloring agent, the electrolyte and a counter electrode, a seal is required between the two electrodes in order to avoid loss of the electrolyte. If a voltage is applied between the two electrodes, the ions of the electrolyte start to diffuse into the coloring agent, and to oxidize it (p-doping) or reduce it (n-doping), depending on the nature of the coloring agent and the applied voltage.

Organic photodetectors, based on conjugated polymers, small molecules, or combinations of these, can be manufactured in semi-transparent form.

By a combination of an electrochromic color system with a semi-transparent array of photodetectors, for example in combinations of individual pixels which are sensitive to the different colors (red, green, blue (RGB)), which is laid over the electrochromic color system, it is possible to make an intelligent color system which recognizes the color of the surroundings and adapts its color to match this. This represents a "chameleon" effect.

The use of organic semi-transparent photodetectors seems suitable because it allows the detection system to be laid over the entire area of the electrochromic color system. However, it is also possible to imagine the use of inorganic photodetectors, such as the use of individual detectors which are separately incorporated into the electrochromic system.

In particular, this system can be flexibly manufactured, by the use and build-up of the color system on semi-transparent metallized foils, such as ITO foils.

In particular, this system permits pixellation, in that individual such electrochromic color elements are connected together on a common substrate.

There are particular advantages from the integration of a semi-transparent photodiode array with an electrochromic color system.

An intelligent color system, which modifies its color as required or adapts itself to the surroundings, for example in conjunction with walls, automobiles, etc. which are manufactured by the combination of an electrochromic color system with photodetectors, in particular by the combination of an electrochromic color system based on conjugated polymers with organic semi-transparent photodetectors.

If this "intelligent" self-adapting color system is made in pixellated form, it is possible to define another application: a full-color copying unit. The semi-transparent pixellated detection system then "writes" the environment image it "reads" into the electrochromic color system.

Figure 1:
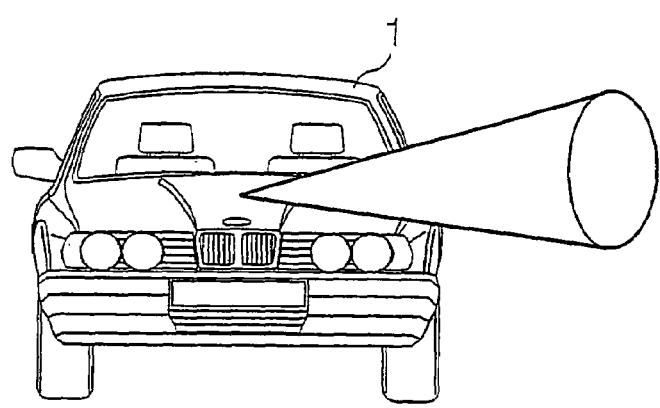
FIG. 1 shows an object surface (1) with an enlarged view of a photocell (11) with a photodetector.
Figure 1:
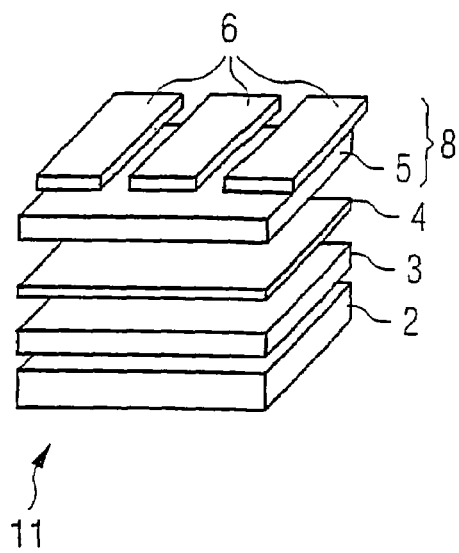
Figure 2:
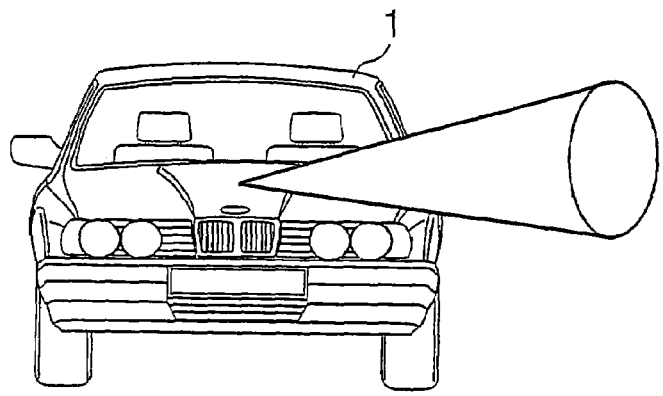
FIG. 2 shows a view corresponding to FIG. 1 but with an external photodetector.
Figure 2:
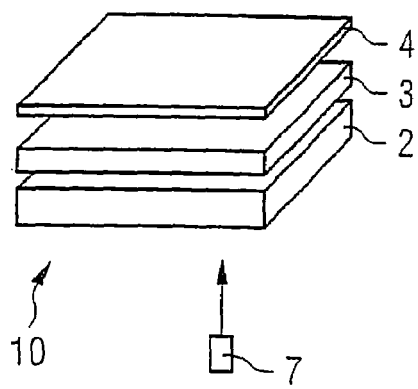

With reference to FIGS. 1–2, the electrochromic color system of the present invention is for applying to an object surface (1) a color which can be varied. The system is applied to the object surface at points or over an area of at least one color cell (10). As illustrated by FIG. 2, the color cells (10) may comprise a first electrode (2), an electrochromic color layer (3) and a second electrode (4) in succession, which color cells are controlled by at least one photodetector (7), in such a way that the color cells (10) adopt a color which corresponds to the color which the photodetector (7) detects.

The electrochromic color system (FIG. 1) may include a color cell (11) combined with a photodetector (8) and is represented by a semi-transparent photodetector layer (5), built up on one of the electrodes (2, 4) of the color cell (11), and following it a semi-transparent third electrode (6). The third electrode (6) of the photodetector (8) has numerous subdivisions, and each of the individual electrodes can be controlled separately.

The invention claimed is:

1. Electrochromic color system for applying to an object surface a color which can be varied,
   the system being applied to the object surface at points or over an area of at least one color cell,
   in which the at least one color cell comprises a first electrode, an electrochromic color layer, and a second electrode in succession, and
   which can be controlled by at least one photodetector, in such a way that one or more color cells adopt a color which corresponds to the color which the photodetector is able to detect.

2. Electrochromic color system in accordance with claim 1, in which the photodetector has an arrangement with numerous image points for a two-dimensional resolution of an object scene.

3. Electrochromic color system in accordance with claim 1, in which the color cell is combined with the photodetector and is represented by a semi-transparent photodetector layer, built up on one of the electrodes of the color cell, and followed by a semi-transparent third electrode.

4. Electrochromic color system in accordance with claim 3, in which the third electrode of the photodetector has numerous subdivisions serving as individual electrodes, and each of the individual electrodes can be controlled separately.

5. Electrochromic color system in accordance with claim 1, in which at least part of the object surface with a sheet construction is represented by numerous connected color cells.

6. Electrochromic color system in accordance with claim 1, wherein, the photodetector comprises a layer of an organic material.

7. Electrochromic color system in accordance with claim 6, in which the organic material is a conjugated polymer.

8. Method for operating an electrochromic color system corresponding to claim 1, comprising
   detecting a monochromic or multi-color image by the at least one photodetector connected to the electrochromic color system, and
   controlling the electrochromic color system so as to reproduce the image on the object surface which is provided with the electrochromic color system.

9. Method in accordance with claim 8, wherein,
   the photodetector comprises a third electrode which has numerous subdivisions serving as individual electrodes, and
   several colors are produced at the color cell by driving the individual electrodes of the photodetector at different voltages.

10. Method in accordance with claim 8, wherein,
    the color cell is combined with the photodetector,
    the photodetector is comprised of a semi-transparent photodetector layer built up on one of the electrodes of the color cell, with the photodetector layer followed by a semi-transparent third electrode,
    an image of the environment, detected by the photodetector, is copied into the underlying color cell.

11. Method of applying color to objects in architectural constructions, on vehicles or textiles, which comprises:
    providing an electrochromic color system in accordance with claim 1; and
    applying color to said objects using said electrochromic color system.

12. Electrochromic color system, comprising:
    a color cell having a color which can be varied,
    the color cell configured for application to an object surface,
    the color cell comprising a first electrode, an electrochromic color layer, and a second electrode in succession; and
    a photodetector connected to the color cell to cause the color cell to adopt a color detected by the photodetector.

13. Electrochromic color system, comprising:
a color cell having a color which can be varied,
the color, cell configured for application to an object surface,
the color cell comprising a first electrode, an electrochromic color layer, and a second electrode in succession; and
a photodetector comprising a semi-transparent photodetector layer built up on the second electrode, and followed by a semi-transparent third electrode,
the photodetector connected to the color cell to cause the color cell to adopt a color detected by the photodetector.

14. Electrochromic color system in accordance with claim 13, wherein, the third electrode comprises plural separately controlled subdivisions serving at separate individual electrodes of the photodetector.

15. Electrochromic color system in accordance with claim 14, wherein, the photodetector comprises a layer of an organic material.

16. Electrochromic color system in accordance with claim 15, in which the organic material is a conjugated polymer.

17. Electrochromic color system in accordance with claim 14, wherein,
several colors are produced at the color cell by driving the individual electrodes of the photodetector at different voltages.

* * * * *